DONALD J. SPENCER
DONALL G. BOURKE
RUDOLPH F. TROST
INVENTORS

BY [signatures]

ATTORNEYS

Oct. 20, 1970 JAMES E. WEBB 3,535,696
ADMINISTRATOR OF THE NATIONAL AERONAUTICS
AND SPACE ADMINISTRATION
DATA COMPRESSION SYSTEM WITH A MINIMUM TIME DELAY UNIT
Filed Nov. 9, 1967 3 Sheets-Sheet 2

DONALD J. SPENCER
DONALL G. BOURKE
RUDOLPH F. TROST
INVENTORS

BY

ATTORNEYS

DONALD J. SPENCER
DONALL G. BOURKE
RUDOLPH F. TROST
INVENTORS

BY

ATTORNEYS 3,535,696

DATA COMPRESSION SYSTEM WITH A MINIMUM TIME DELAY UNIT

James E. Webb, Administrator of the National Aeronautics and Space Administration, with respect to an invention of Donald J. Spencer, Santa Monica, and Donall G. Bourke, Altadena, Calif., and Rudolph F. Trost, Berwyn, Pa.

Filed Nov. 9, 1967, Ser. No. 681,692
Int. Cl. H04b *1/66;* H04j *3/18*
U.S. Cl. 340—172.5 10 Claims

ABSTRACT OF THE DISCLOSURE

A data channel which includes a minimum time delay unit, designed to minimize the time required to pass data through the channel from a source which has previously been found to provide non-redundant data. The unit includes a memory with a word associated with each source. The word includes a significance-indicating bit which is set when data, received from its associated source, is determined by a processor to be non-redundant. The data is thereafter transferred to a first-in first-out buffer memory. Then, when the channel is activated to supply data, the unit's memory is searched for a word with a set significance-indicating bit to directly transfer data from a source associated with the word, rather than data from the buffer.

ORIGIN OF INVENTION

The invention described herein was made in the performance of work under a NASA contract and is subject to the provisions of Section 305 of the National Aeronautics and Space Act of 1958, Public Law 85–568 (72 Stat. 435; 42 USC 2457).

BACKGROUND OF THE INVENTION

Field of the invention

This invention generally relates to a data compression system and, more particularly, to improvements in a general time multiplexed data compression system.

Description of the prior art

Herebefore, whenever data, provided by a plurality of sources, is to be efficiently supplied to a data utilization system, such as a transmitter or computer, time multiplexing and data compression techniques are generally employed. In the prior art, particularly that relating to the communication of data from spacecrafts or satellites, systems are known which include arrangements whereby any one of a plurality of sources is selectively addressed to receive data therefrom. The received data is analyzed by a processor to determine the significance or non-redundancy of the data in accordance with selected processing parameters or criteria. These may be fixed or adaptive. If the data is found to be non-redundant, it is transfererd to a first-in first-out buffer memory. The output of the buffer memory is supplied to an output stage, which is in turn connected to a data utilization device such as a transmitter. Such an arrangement may be thought of as a data channel.

When a data utilization system is connected to receive data from the output stages of several data channels, the system sends data-transfer control signals to the channel from which it is ready to receive signals, thereby enabling one data utilization system to serve a plurality of channels.

Since the flow of data into the buffer memory of each channel is dependent on the non-redundancy of the data from the various sources which the channel serves, the data flow is of an irregular rate. This rate may exceed the buffer memory output rate, the latter being a function of the number of channels which a single data utilization system serves, as well as the overall data utilization rate.

When the data utilization rate is very low as, for example, in a deep space mission, the rate of data flow from each channel is low, resulting in a significant number of non-redundant data samples stored in the buffer memory of each data channel, and more importantly, a large time delay between the time a non-redundant data sample is stored in the buffer memory and the time such sample is transferred out of the channel. Such large time delay is often unacceptable for many operationally important measurements, whose associated subsystems may require timely correction in the event of anomalous behavior. For example, some space missions could experience catastrophic failure, unless signals are received from certain subsystems in the spacecraft with a minimum delay, so that corrective measures could be taken on the ground to avert such failure.

OBJECTS AND SUMMARY OF THE INVENTION

It is a primary object of the present invention to provide an improved data compression system.

Another object of the present invention is to provide an improved data channel through which significant data may be communicated from any one of a plurality of data-providing sources with a minimum of time delay.

A further object of the present invention is the provision of an improved minimum time delay unit which can be conveniently incorporated in presently known general time multiplexed data compression channels in order to minimize the delay associated with the transfer of non-redundant data samples from any one of a plurality of sources connected to the channel, to a data utilization system.

Still a further object of the present invention is to provide a data communication system, finding particular utility in space missions and designed to minimize the time between the reception of non-redundant data samples from a data-providing source to the system's transmitter, for transmission to earth.

These and other objects of the present invention are achieved by incorporating, in an otherwise conventional time multiplexed data compression channel, a minimum time delay unit. This unit is operable to address any one of the sources to receive data therefrom and transfer such data to the output stage of the channel, ahead of data from the buffer memory, when it is indicated that data, previously received from such source by the processor of the data compression channel, has been found to be non-redundant.

Briefly, the minimum time delay (MTD) unit includes a memory with a multibit storage word for each one of the data-providing sources. Each word includes a significance-indicating bit which is set when the processor of the channel receives data from the source associated with the word, of which the bit forms a part, and the received data is found to be non-redundant. The MTD unit also includes an addressor, capable of addressing the unit's memory, any one of the sources, and associated logic control circuitry. Time sharing techniques are employed to share the addressing of the source and the MTD memory by the processor and the MTD addressor.

In operation, when the processor addresses any of the data sources to receive data therefrom, it also addresses the MTD memory to read out the word associated with the particular source. If the data received by the processor from the source is found to be non-redundant, the significance-indicating bit of the word is set. Then, during the time when the MTD addressor is capable of addressing any of the sources, if data-transfer control signals are received from the data utilization system, indicating that data may be transferred thereto from the particular channel, the MTD addressor addresses one of the sources, as well as the MTD memory to read out the word associated with such source. If the significance-indicating bit of the word read out from the MTD memory is in a set state, indicating that previously no-redundant or significant data was transferred from that source to the processor, the MTD logic control directly supplies the current data from the source to the channel's output stage.

Therein, priority circuitry is incorporated to transfer to the data utilization system the data received from the MTD unit rather than that from the buffer memory. Consequently, the data from the source is directly transferred to the data utilization system, bypassing the buffer memory and thereby eliminating the delay associated with the buffer memory in which the last received data is last to be transferred therefrom. Each storage word in the MTD memory further includes a plurality of bits used to control the maximum rate at which data from any one of the sources may be bypassed through the MTD unit for direct transfer to the data utilization system.

The novel features that are considered characteristic of this invention are set forth with particularity in the appended claims. The invention will best be understood from the following description when read in connection with the accompanying drawings.

DESCRIPTION OF THE PREFERRED EMBODIMENTS

Figure 1:
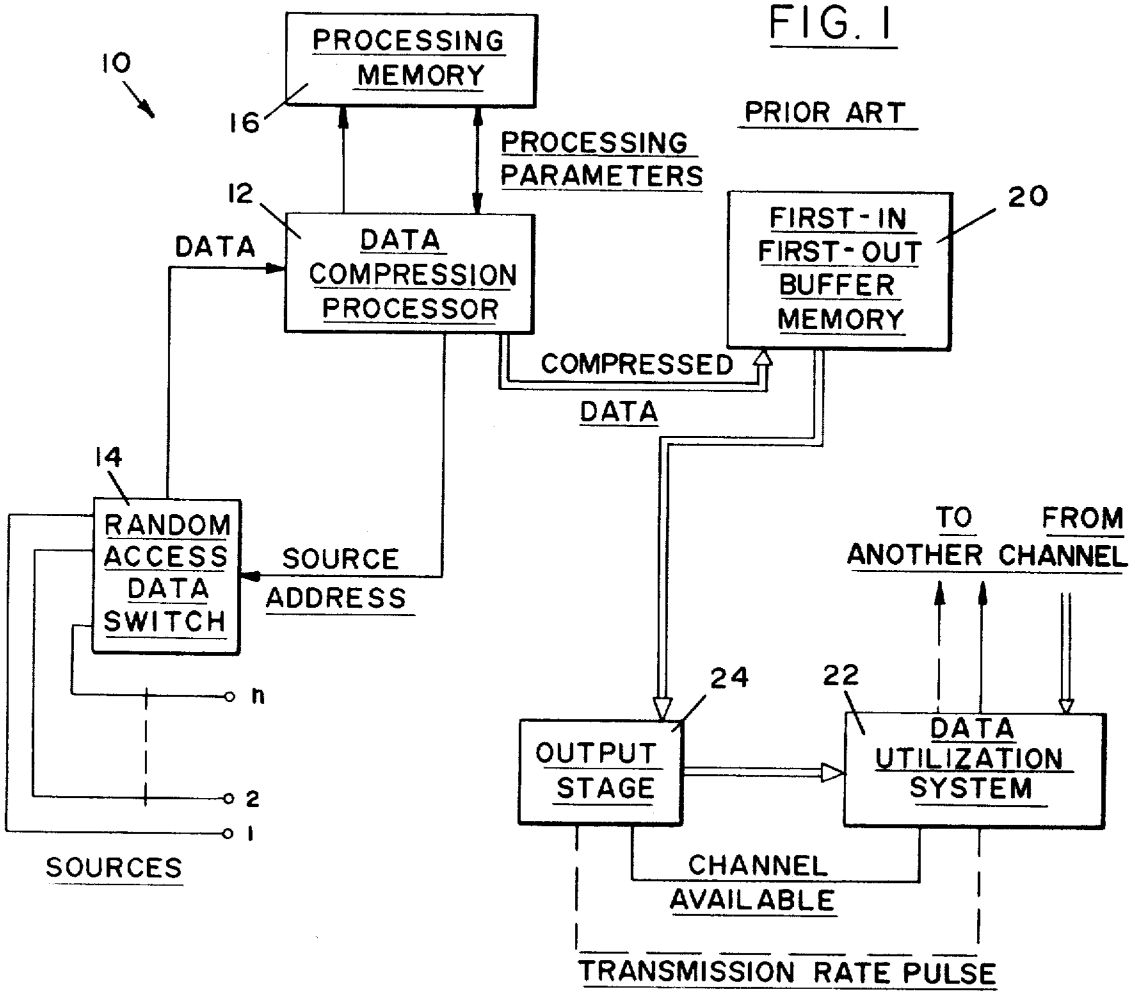
FIG. 1 is a simplified block diagram of a prior art generalized time delay multiplexed data compression system with the details of one data channel, represented in block form.

For a better understanding of the present invention, reference is first made to a generalized time multiplexed data compression channel 10, of the type well known in the art. The channel 10 is shown including a data compression processor 12, which is selectively connected to any one of data-providing sources 1 through *n* through a random access data switch 14. That is, processor 12 addresses switch 14 to gain access to any one of the sources so as to receive data therefrom. The received data is then processed by processor 12 which operates in conjunction with a processing memory 16. Processing memory 16 supplies processor 12 with processing parameters or criteria to determine whether the data received from the addressed source is to be deemed significant, or non-redundant. If found non-redundant, the data together with the source address represented as compressed data, is supplied to a first-in first-out buffer memory 20, whose output is in turn connected to a data utilization system 22 through an output stage 24. One example of data utilization system 22 is a transmitting system, such as may be used to transmit signals to a receiver.

The data utilization system 22 may be connected to more than one data channel, as is the case in most space communication. The supply of data from each channel, such as channel 10 to the data utilization system 22 is controlled by means of data-transfer control signals supplied by the data utilization system 22 to the output stage 24. These control signals may comprise a transmission rate pulse, supplied at the utilization rate of system 22. A second signal which is generally in the form of an enabling level, and designated in FIG. 1 as "channel available," is supplied to output stage 24 whenever the data utilization system 22 is ready to receive data from data channel 10. Such data-transfer control signals and compressed data may be respectively supplied to and received from other data channels.

As is appreciated by those familiar with the art, a channel, such as data channel 10 has certain advantages, primarily that of sending to the data utilization system only data which is deemed to be non-redundant or significant. However, a basic disadvantage of such a channel is the delay in the transmission of data from any of the sources to the data utilization system, due to the delay through the first-in first-out buffer memory. This delay becomes paricularly disadvantageous and sometimes intolerable when the data utilization rate of the data utilization system 22 is low, as is often the case in deep space missions, and the rate of non-redundant data received from the sources is quite high.

When this happens, a denger exists that the buffer memory 20 will overflow with non-redundant information. Also, as the amount of data stored in the buffer 20 increases, the delay of the transmission of data through it increases, which is most disadvantageous, if significant data from any of the sources is to be transmitted as soon as possible in order to send corrective measures to a particular subsystem where the data source originates to avoid the catastrophic failure thereof. It is the basic object of the present invention to minimize the delay encountered in the transmission of no-redudant data from any of the sources through the data channel.

Figure 2:
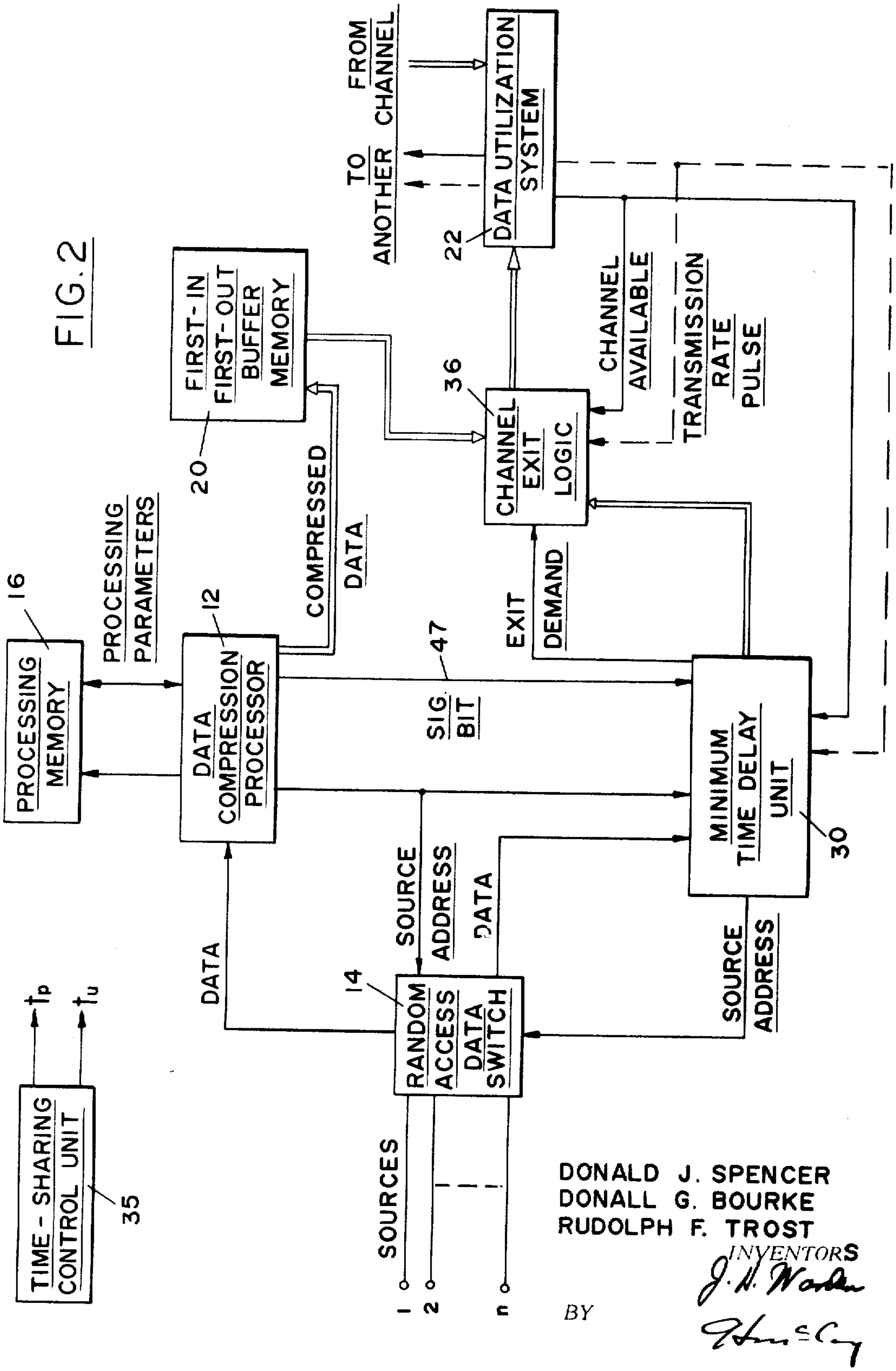
FIG. 2 is a simplified block diagram of an improved data channel with the minimum time delay unit of the present invention.

The present invention may better be explained by referring to FIG. 2 which is a block diagram of a data channel, similar to channel 10, herebefore described, but one which includes a minimum time delay unit 30. In FIG. 2, elements like those shown in FIG. 1 are designated by like numerals. Briefly, the MTD unit 30 includes an MTD memory, an MTD addressor, an MTD logic circuitry, all of which will be described hereafter in greater detail.

The MTD memory of unit 30 and switch 14 are addressable by either the MTD addressor or the data compression processor 12. In order to control the addressing by these two independent means, the data channel is assumed to respond to time sharing control signals, designated $t_p$ and $t_u$, supplied by a time sharing control unit 35. Addressing by processor 12 is limited to the durations of signals or pulses $t_p$, while the addressing of the MTD addressor is limited to the durations of signals $t_u$. In addition to the MTD unit 30, the improved data channel includes a channel exit logic 36, replacing the output stage 24, shown in FIG. 1. Logic 36, activated by the data-transfer control signals from the data utilization system, supplies data to the system 22, i.e. compressed data from memory 20 or real time data from the MTD unit 30, with priority of transmission being given to the real time data from unit 30. The priority is determined by an exit demand signal supplied to exit logic 36 by unit 30.

The MTD memory in unit 30 includes a multibit storage word for each one of the sources 1 through *n*. Each word includes a significance-indicating bit which is set by the processor 12 during the $t_p$ period and when the data from the source associated with the particular word is determined to be non-redundant or significant. During the $t_u$ period and when the data transfer control signals from the data utilization system 22 are received by unit 30, the MTD addressor addresses each one of the sources as well as its associated word in the MTD memory. If when addressing one of the sources, the significance-indicating bit of its associated word is set, the data from the particularly addressed source is transferred through the unit 30 to the exit logic 36 for transmission to the data utilization system 22. Consequently, the delay in the transmission of the data from the source through the channel is eliminated. In addition to the significance-indicating bit, each word in the MTD memory includes a plurality of bits used to control the maximum rate at which data from any one of the sources may be transferred to the transmitting system 22 through the MTD unit 30.

Figure 3:
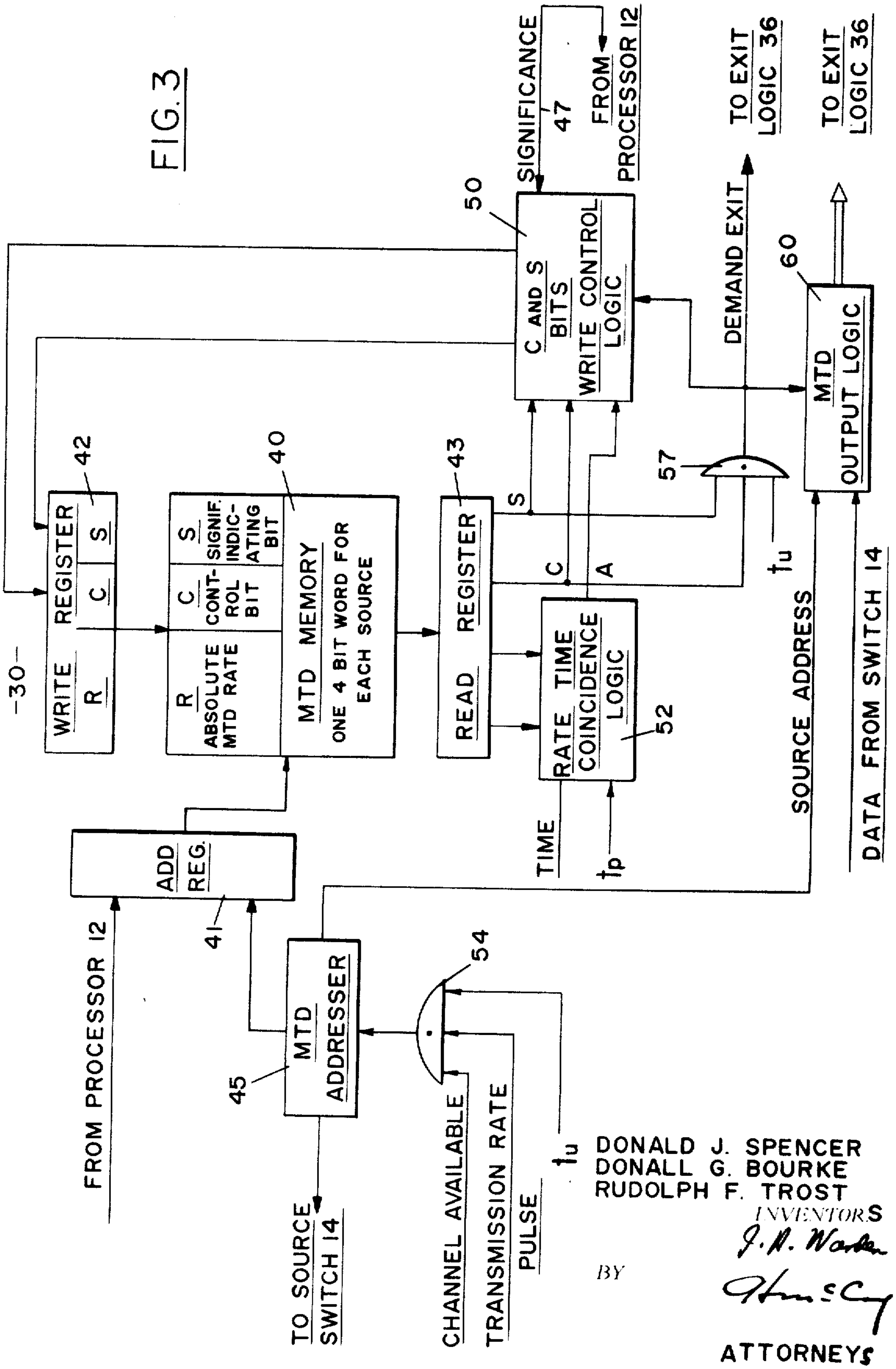
FIG. 3 is a detailed block diagram of the novel minimum time delay unit of the present invention.

Reference is now made to FIG. 3 which is a detailed block diagram of the MTD unit 30. Therein, the MTD memory is designated by numeral 40, with its address, write and read registers designated 41, 42, and 43 respectively. Also, in FIG. 3, the MTD addressor is designated by reference numeral 45. The MTD memory 40 includes a 4-bit word for each one of the sources 1 through $n$. In the arrangement diagrammed in FIG. 3, each word is assumed to consist of a single significance-indicating bit designated S, and two R bits. The function of the R bits is to control the absolute MTD rate for the particular source associated with the word. The fourth bit, designated C, is assumed to comprise a control bit.

Briefly, when processor 12 addresses switch 14 during a $t_p$ period to receive data from any of the sources, the processor also addresses the memory to read out the word associated with the particular addressed source. If the data received from the source by the processor is found to be significant or non-redundant, the processor 12 supplies a significance-indicating signal via line 47 to a write control logic 50 in the MTD unit to set the S bit of the word which has been read out. Then, when the word is rewritten into memory, the S bit thereof is set, thereby indicating that previously, data from the source associated with the word has been found to be non-redundant. Also, when a word is read out in response to an address by processor 12, the two R bits are supplied to a rate time coincidence logic 52 to which an elapsed time reference such as a clocked counter is connected. For each word read out, a true output signal A is then generated periodically with a frequency equal to the decoded rate value of the R bits. The A signal is supplied to the write control logic 50 to set the C bit of the word just read out. Thus, when memory 40 is addressed by processor 12 and a word is read out, either the C bit or the S bit or both bits may be set to true.

Then, during the period of the time sharing control signals $t_u$, representing periods when the MTD addressor 45 may address the MTD memory 40, the time sharing signals are supplied to one input of an AND gate 54. The transmission rate pulses from the data utilization system 22 are supplied to another input of the same gate while the channel available level is supplied to a third input of the gate. Thus, if the transmitting system 22 is ready to receive data from the particular channel, all three inputs of gate 54 are true, enabling it to actuate the MTD addressor 45 to address one of the words in memory 40 as well as the source associated with that particular word. The MTD addressor 45 may comprise a binary counter which is incremented by true outputs of gate 54.

If bits C and S of the particular addressed word are set or true, an AND gate 57 is enabled to provide a true output, which serves three functions. One function is to enable an MTD output logic 60 to transfer the data from the source addressed by addressor 45, as well as the source's address through an MTD output logic 60 as real time data to the exit logic 36. Also, the true output of gate 57 provides the exit demand signal to exit logic 36 (FIG. 2) to cause the latter to transmit the real time data from the output logic 60 to the data utilization system 22 rather than the compressed data from buffer memory 20. The third function performed by the output of gate 57 is to control the C and S bits write control logic 50 to reset the C and S bits of a word associated with a source whose data has been transferred through the MTD output logic 60 to the exit logic 36.

For an explanation of when and how the C bit is set attention is directed to the following description. The processor 12, when receiving data from any of the sources address during a $t_p$ period thereby causes the reading out of a word from memory 40 associated with the particular source. If the data is found to be non-redundant, processor 12, via line 47, causes the setting of the S bit of the particular word. Also, when read out by an address from processor 12, the two R bits of the word are supplied to the rate time coincidence logic 52 which provides a true output A, at a frequency dependent on the decoded binary states of the two R bits. When the A output is true, control logic 50 causes the C bit to be set.

Then during a $t_u$ period, when the data utilization system 22 is ready to receive data from the channel, gate 54 is enabled to cause addressor 45 to address one of the sources, as well as to read out the word associated therewith in the MTD memory 40. If during such read out, both the C and the S bits of that particular word are true, gate 57 is enabled to in turn enable the MTD output logic 60 to transfer to the data utilization system 22 through the channel exit logic 36 the data from the address source, as well as its address and thereby eliminate the delay encountered in the buffer memory 20.

The minimum delay for any channel depends on the number of sources, the data utilization transmission pulse rate and the frequency at which the channel's R bits provide a true A output. For example, if the number of sources is 10 and the transmission rate is 10, then the minimum delay is 10/10=1 or the period of the frequency, whichever is larger. If there has been a relatively long period of unavailability of the data utilization system 22 to the data channel, and some of the C bits of words in the MTD memory 40 are set together with their respective S bits, then the minimum delay for any source data once the data utilization system becomes available, is bounded by the time required to cycle once through the MTD memory at the transmission pulse rate.

It should be pointed out that the rates or frequencies of signals $t_p$, $t_u$ and the transmission rate pulses are a function of the overall communication system as well as the absolute value $n$, that is the number of sources connected to the channel. Also, the four frequencies of the signal A are dependent on the decoding of the states of the two R bits and the timing supplied to the logic 52 (FIG. 3).

It should further by pointed out that in the foregoing example during periods of channel availability, unless the rate at which data from each source could be transferred through the MTD unit is limited, half of the non-redundant data would be transferred to the transmitting system 22 (FIG. 2) through unit 30. To prevent this from occurring, the two R bits and the C bit are included in each word. Assuming that the two R bits of the word associated with channel 1 cause the time coincidence logic 52 to provide a true output A only once every 4 seconds, then it should be appreciated that only once in 4 seconds would the C bit of this word be set. Consequently, the maximum rate at which data from channel 1 can be transferred through unit 30 is once per four seconds, regardless of the transmission pulse rate, channel availability or the non-redundant activity of channel 1. By using two R bits, any one of four frequencies of A may be chosen. The R bits of each word may be preset or reprogrammed at will during operation. The number of R bits is obviously expandable to meet demands for a greater number of absolute MTD rates.

Figure 4:
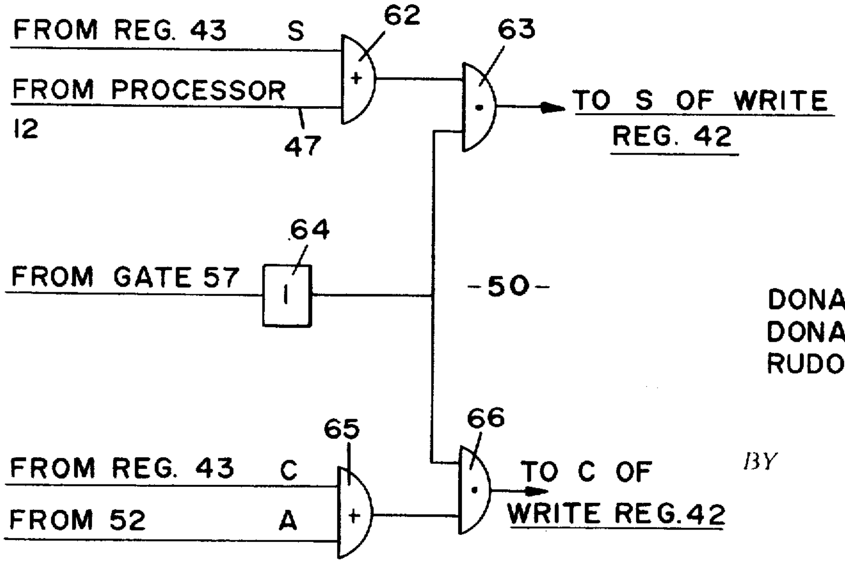
FIG. 4 is a logic diagram of one of the blocks shown in FIG. 3.

Reference is now made to FIG. 4 which is a simple logic diagram of control logic 50 (FIG. 3). It includes an OR gate 62 which is connected to processor 12 to receive the significance indicating signal via line 47 as well as to the S bit of read register 43. Thus, the output of gate 62 is true either when the processor indicates that data received from a source is significant or when the S bit read out from register 43 is true.

This output is supplied to one input of an AND gate 63 whose other input is connected to an inverter 64, which provides a false output when the output of gate 57 is true. Thus when data is transferred through logic 60 (FIG. 3), gate 63 is disabled so that its output causes the resetting of the S bit by write register 42.

Logic 50 further includes an OR gate 65 which is set to true when A from logic 52 is true or when the C bit from register 43 is true. AND gate 66 is used to control the state of the C bit in write register 42, setting it when the output of gate 65 is true and the output of inverter 64 is true (gate 57 output is false). However, if data is transferred through MTD output logic 60, the output of inverter 64 is false so that the C bit in register 42 is reset irrespective of the output of gate 65.

There has accordingly been shown and described a novel data compression system with a minimum time delay unit. It is appreciated that those familiar with the art may make modifications in the arrangements as shown without departing from the spirit of the invention. Therefore, all such modifications and/or equivalents are deemed to fall within the scope of the invention as claimed in the appended claims.

We claim:

1. In a data channel of the type connectable to a data utilization system for supplying data for transmission to said system upon receipt of data-transfer control signals therefrom, the improvement comprising:

*n* data-providing sources;

a data compression unit in said channel for receiving data from any of said sources addressed thereby, said data compression unit including memory means for storing data from any addressed source, determined by said data compression unit to be non-redundant in accordance with selected criteria, said data compression unit further including an output stage for supplying data to said data utilization system from said memory means on a first-in first-out basis;

a memory unit of *n* storage words, each associated with a different one of said *n* sources, each word including a non-redundancy-indicating bit;

means connecting said memory unit to said data compression unit to set the non-redundancy-indicating bit of a word to a first state when data from the source associated with said word is non-redundant; and control means coupled to said sources and said memory unit for supplying data to said data utilization system through said output means directly from an addressed source whose associated word has its non-redundancy-indicating bit in said first state.

2. The improvement as recited in claim 1 wherein each word includes a control bit, settable to said first state at a selected rate of any one of a plurality of rates, said control means including means for supplying data to said utilization system through said output means directly from an addressed source whose associated word has both its non-redundancy-indicating bit and its control bit in said first state.

3. The improvement as recited in claim 2 wherein each word further includes at least one rate-defining bit for controlling the rate at which the control bit of the word is set at said first state.

4. The improvement as recited in claim 3 wherein each word includes *z* rate-defining bits and said control means includes time coincidence logic means for decoding the states of said *z* rate-defining bits to provide a rate control signal at any of $2_z$ rates which is a function of the states of said *z* rate-defining bits and means for setting said control bit when said control signal is of a predetermined true indicating level.

5. In a data channel of the type connectable to a transmitter to supply data thereto for transmission upon receiving data-transfer control signals therefrom, the improvement comprising:

data providing sources;

a data compression unit for analyzing data from each of said sources to determine its redundancy characteristics and for storing non-redundant data, said data compression unit further including means for reading out stored data on the basis of first-in first-out;

a minimum delay unit including a memory of *n* storage words, each word being associated with a different one of said sources and including a non-redundancy-indicating bit, said minimum delay unit including means responsive to said data transfer control signals for directly addressing to receive data from any one of said sources and addressing the memory to read out the word associated with the source from which data is received, said minimum delay unit including readout means for reading out the data received from a source only when the non-redundancy-indicating bit in the word associated therewith is in a set state;

means connecting the data compression unit to said minimum delay unit, to set the non-redundancy-indicating bit of a word when data from the source associated with said word is found by said data compression unit to be non-redundant in accordance with preselected criteria;

channel exit means for supplying to a transmitter data from either said data compression means or said minimum delay unit; and time sharing control means coupled to said data compression and minimum delay units for controlling the periods when said sources and said memory are addressed by said data compression and minimum delay units.

6. In combination, a data channel and data utilization means providing data-transfer control signals to a said data channel to receive data therefrom, the data channel comprising:

a plurality of data-providing sources;

a data compression unit including a processor for receiving data from any one of said sources to determine the non-redundancy of data therefrom in accordance with preselected criteria, first-in first-out memory means for storing data from said sources determined by said processor to be non-redundant;

a minimum time delay unit including a memory having storage words, each word associated with a different one of said sources, each word including a non-redundancy-indicating bit, an addressor responsive to said data-transfer control signals for simultaneously addressing any one of said sources and the word associated therewith, and logic means for reading out the data from the addressed source when at least the non-redundancy-indicating bit is in a set state;

means connecting said processor to said memory to set the non-redundancy-indicating bit of a word associated with a source whose data is determined by said processor to be non-redundant;

time-sharing control means coupled to said data compression unit and to said minimum time delay unit for controlling the addressing of said sources and the memory in said minimum time delay unit by said data compression unit and said minimum time delay unit; and channel exit means responsive to said data-transfer control signals, the memory means in said data compression unit and the logic means in said minimum time delay unit for transferring data to said utilization means from said memory means unless at least the non-redundancy-indicating bit of a word associated with a source addressed by said minimum time delay unit is in a set state wherein said exit means transfers to said utilization unit the data from said addressed source.

7. The data channel as recited in claim 6 wherein the addressor in said minimum time delay unit comprises a counter, incremented by said data-transfer control signals for sequentially addressing the data-providing sources and their respective associated words in the memory in said minimum time delay unit.

8. The data channel as recited in claim 7 wherein each storage word in the memory of said minimum time delay unit includes an additional bit which is set at a rate related to the source with which the word is associated, said minimum time delay unit further including gating means for controlling said channel exit means only when both the non-redundancy indicating bit and the additional bit of a word are in the set state.

9. The data channel as recited in claim 6 wherein each storage word in the memory of said minimum time delay unit includes an additional bit which is set at a rate related to the source with which the word is associated, said minimum time delay unit further including gating means for controlling said channel exit means only when both the non-redundancy indicating bit and the additional bit of a word are in the set state.

10. The data channel as recited in claim 9 wherein the addressor in said minimum time delay unit comprises a counter, incremented by said date-transfer control signals for sequentially addressing the data-providing sources and their respective associated words in the memory in said minimum time delay unit.

References Cited

UNITED STATES PATENTS

| | | | |
|---|---|---|---|
| 3,185,823 | 5/1965 | Ellersick et al. | 235—154 |
| 3,185,824 | 5/1965 | Blasbalg et al. | 235—154 |
| 3,213,268 | 10/1965 | Ellersick | 235—154 |
| 3,237,170 | 2/1966 | Blasbalg et al. | 340—172.5 |
| 3,369,222 | 2/1968 | Webb | 340—172.5 |
| 3,422,403 | 1/1969 | Webb | 340—172.5 |

RAULFE B. ZACHE, Primary Examiner